Figure 1:
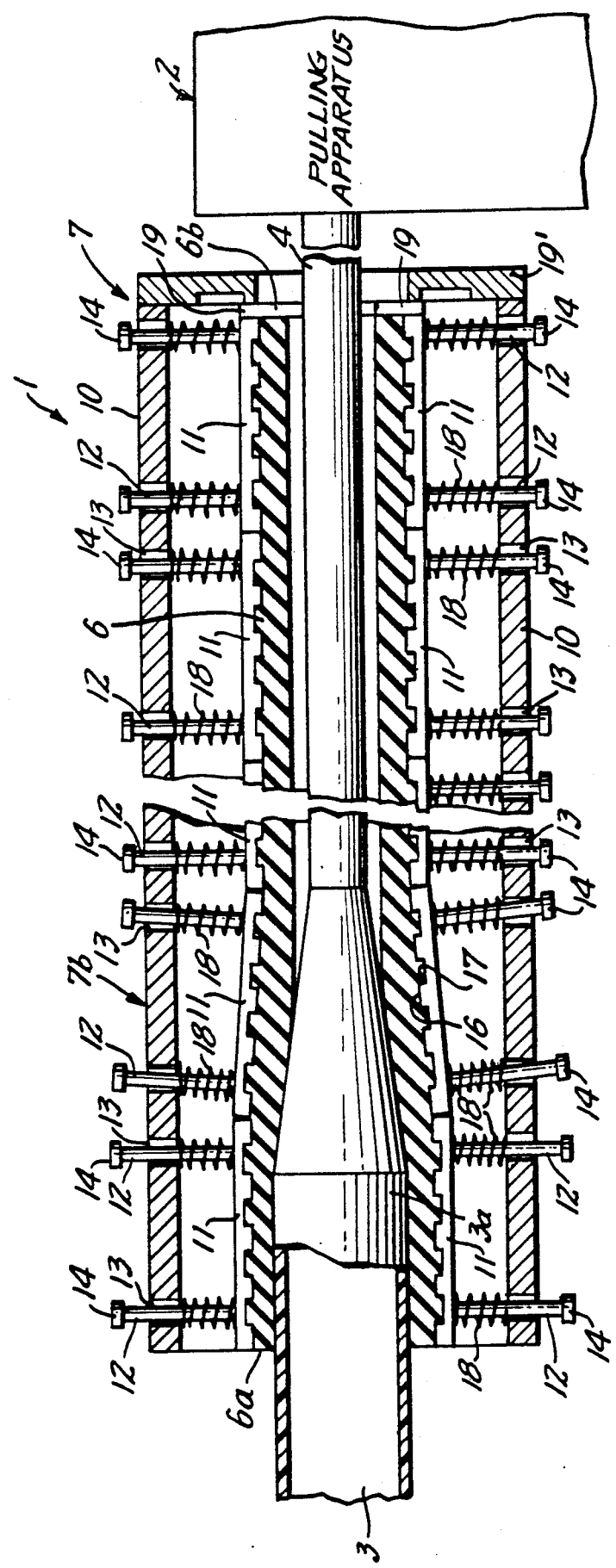

United States Patent [19]

Vallauri et al.

[11] Patent Number: 5,052,092
[45] Date of Patent: Oct. 1, 1991

[54] APPARATUS FOR INSERTING A RIGID SUPPORT WITHIN A CONTRACTABLE SLEEVE FOR ELECTRIC CABLE JOINTS

[75] Inventors: Ubaldo Vallauri, Monza; Francesco Portas, Quattordio, both of Italy

[73] Assignee: Societa' Cavi Pirelli S.p.A., Milan, Italy

[21] Appl. No.: 619,678

[22] Filed: Nov. 29, 1990

Related U.S. Application Data

[63] Continuation of Ser. No. 433,710, Nov. 8, 1989, abandoned.

[30] Foreign Application Priority Data

Nov. 11, 1988 [IT] Italy .................................. 22585 A/88

[51] Int. Cl.$^5$ ............................................ N23P 19/04
[52] U.S. Cl. ......................................... 29/234; 29/235; 29/450; 29/745; 269/254 CS; 269/287
[58] Field of Search .................. 29/234, 235, 241, 282, 29/450, 745, 507, 508, 522.1, 523; 269/254 CS, 287; 72/293, 295, 305

[56] References Cited

U.S. PATENT DOCUMENTS

| 2,246,954 | 6/1941 | Schleinitz | 29/507 |
| 2,800,867 | 7/1957 | Smith | 269/287 X |
| 3,177,566 | 4/1965 | Hester | 29/235 X |
| 3,640,115 | 2/1972 | Duncan et al. | 29/234 X |
| 3,795,035 | 3/1974 | Pogonowski | 29/282 X |
| 4,371,199 | 2/1983 | Kushner et al. | 29/458 X |
| 4,411,409 | 10/1983 | Smith | 29/234 |
| 4,417,394 | 11/1983 | Moody et al. | 29/450 X |
| 4,491,307 | 1/1985 | Ellefson | 296/287 X |
| 4,535,822 | 8/1985 | Rogers, Jr. | 29/234 |
| 4,638,544 | 1/1987 | McNeil | 29/450 X |
| 4,653,182 | 3/1987 | Fukuda et al. | 29/450 X |
| 4,666,138 | 5/1987 | Dearnar | 269/287 |
| 4,821,393 | 4/1989 | Spigarelli | 269/254 CS X |

Primary Examiner—P. W. Echols
Assistant Examiner—David P. Bryant
Attorney, Agent, or Firm—Brooks Haidt Haffner & Delahunty

[57] ABSTRACT

Process and apparatus for inserting a rigid support in a contractible sleeve used to enclose a joint between a pair of electric cables. The support has an outer diameter greater than the unstretched inner diameter of the sleeve. The sleeve is enclosed in a pair of separable half-shells having radially movable pressure elements extending radially inwardly therefrom and engageable with the outer surface of the sleeve. The pressure elements are urged inwardly by compression springs, and the pressure applied to the sleeve by the pressure elements increases with radially outward movmeent thereof. One end of the support is inserted in one end of the sleeve and the support is pulled axially into the sleeve while axial movement and shortening and buckling of the sleeve is opposed by the pressure elements.

7 Claims, 2 Drawing Sheets 5,052,092

APPARATUS FOR INSERTING A RIGID SUPPORT WITHIN A CONTRACTABLE SLEEVE FOR ELECTRIC CABLE JOINTS

This application is a continuation of U.S. application Ser. No. 07/433,710, filed Nov. 8, 1989, now abandoned.

BACKGROUND OF THE INVENTION

The present invention relates to a process and apparatus for inserting a rigid support within a contractible sleeve for covering a joint between electric cables, said apparatus being of the type which comprises a device arranged to engage a sleeve for fixing its positioning in axial direction and an actuator arranged to engage a rigid support having an outer diameter greater than the unstretched inner diameter of the sleeve and which is to be coaxially inserted in the sleeve by applying on the support itself an advancing force directed in axial direction.

As is known, in a joint, the connections between the conductors of electric cables usually are enclosed within sleeves which can be fundamentally classified in two classes: sleeves of heat-shrinkable material and sleeves of elastomeric material. For installation purposes, both types of said sleeves must be applied on rigid supports, generally of cylindrical tubular configuration and having an outer diameter greater than the unstretched inner diameter of the corresponding sleeve.

When the sleeve is of the heat-shrinkable type, its application takes place by previously heating the sleeve itself. After the sleeve has cooled, it will maintain its dimension even when it is removed from the support. Then, the sleeve per se is subjected to flame heating causing it to shrink and tending to return it to the original dimensions.

In the case of sleeves of elastomeric material, their application to the support is carried out through the forced insertion of the support into the sleeve and consequent elastic expansion of the sleeve. Consequently, the sleeve will tend to assume its original dimensions as soon as it is removed from the support.

The described operations mainly have the purpose of causing an expansion of the sleeve in the radial direction to allow an easy application of the sleeve over one of the cables before effecting the connection of the cables. When the conductors of the cables have been mutually interconnected, the sleeve is positioned on the joining zone and is caused to shrink (such as by heating the heat-shrinkable sleeves or by merely removing the support from the elastomeric sleeves) and to grip the surfaces of the insulations of the cables.

It is found that the apparatus used at the present time for applying the sleeves, either of heat-shrinkable type or of the elastomeric type, on the respective supports substantially comprises an actuator acting on the rigid support to insert it within the sleeve starting from a first end of the sleeve, and a device which engages the sleeve in proximity of its second end for fixing its positioning in the axial direction and reacting to the axial force which causes the translation of the support.

It has been found that the use of the conventional apparatus leads easily to a series of drawbacks deriving substantially from the fact that the sleeve tends, undesirably, to shorten during the insertion of the rigid support. Moreover, it has to be considered that often the sleeves of this type have a considerable length with respect to the cross-section thereof, and the result is, therefore, that the sleeve is very sensitive to the buckling loads applied on them during the application operation.

As a result, the length of the sleeves applied on the supports is considerably less than the original length of the sleeves before application to the support, and the sleeves can suffer damage due to possible foldings that a buckling load can cause. It is easy to understand that this situation can compromise the reliability of the sleeves, and therefore, the reliability of the joints of cables formed therewith since the sleeve may be deformed in its structure, or the pressure exerted by it on the surfaces of the cables can be distributed irregularly.

In addition to the above, it is found that, to limit as much as possible the described drawbacks, it is necessary that the insertion of the support within the sleeve be made very slowly with a consequent reduction of the productivity.

BRIEF SUMMARY OF THE INVENTION

The main object of the present invention is substantially that of overcoming the drawbacks of the known technique, by means of a process and apparatus which are able to prevent effectively the sleeve from suffering reductions in length, irregular deformations and risks of being damaged during the insertion of the support.

This object and other ones, which will be better evident from the detailed description of the invention set forth hereinafter, are achieved substantially by means of a process for inserting on a rigid support a sleeve for joints of electric cables, characterized by the fact of comprising the steps of placing a sleeve between two half-shells substantially conforming in shape to the sleeve itself to engage it along its whole length; applying on the sleeve radially inwardly directed forces uniformly distributed on the outer surface of the sleeve; inserting in a first end of the sleeve a rigid support and translating the support towards the second end of the sleeve through an axial force applied on said support and directed towards the second end, said rigid support having an outer diameter greater than the inner diameter of the sleeve before enlargement of the latter; increasing, during the insertion of the support, the magnitude of said radial inwardly directed forces in the zones at which the end of the support gradually reaches; applying on the outer surface of the sleeve, during the insertion of the support, opposite forces parallel to the axis of the sleeve, distributed along its entire length and directed in the direction opposite to the axial force applied to the support; discontinuing the opposite and radially inward forces after the support has been inserted into the sleeve along the entire length of this latter; and removing the sleeve with the support from the half-shells.

According to the present invention, the described process is carried out by means of an apparatus for inserting a rigid support in a sleeve for joints of electric cables, characterized by the fact that said apparatus comprises two half-shells which can be brought together, each one having an outer supporting portion to which a plurality of pressure elements is connected in a reciprocable manner, said pressure elements being uniformly distributed to define, when the half-shells are together, a containment chamber wherein said sleeve is housed, and thrusting means acting between the supporting portion of each half-shell the pressure elements and pushing the pressure elements towards the axis of the sleeve to apply radially inwardly directed forces on the outer surface of the sleeve thereby to provide contact of said outer surface with the pressure elements in order to give rise to opposing forces distributed along the entire length of the sleeve which oppose the thrust exerted by the support when this latter is inserted into the sleeve itself.

Figure 2:
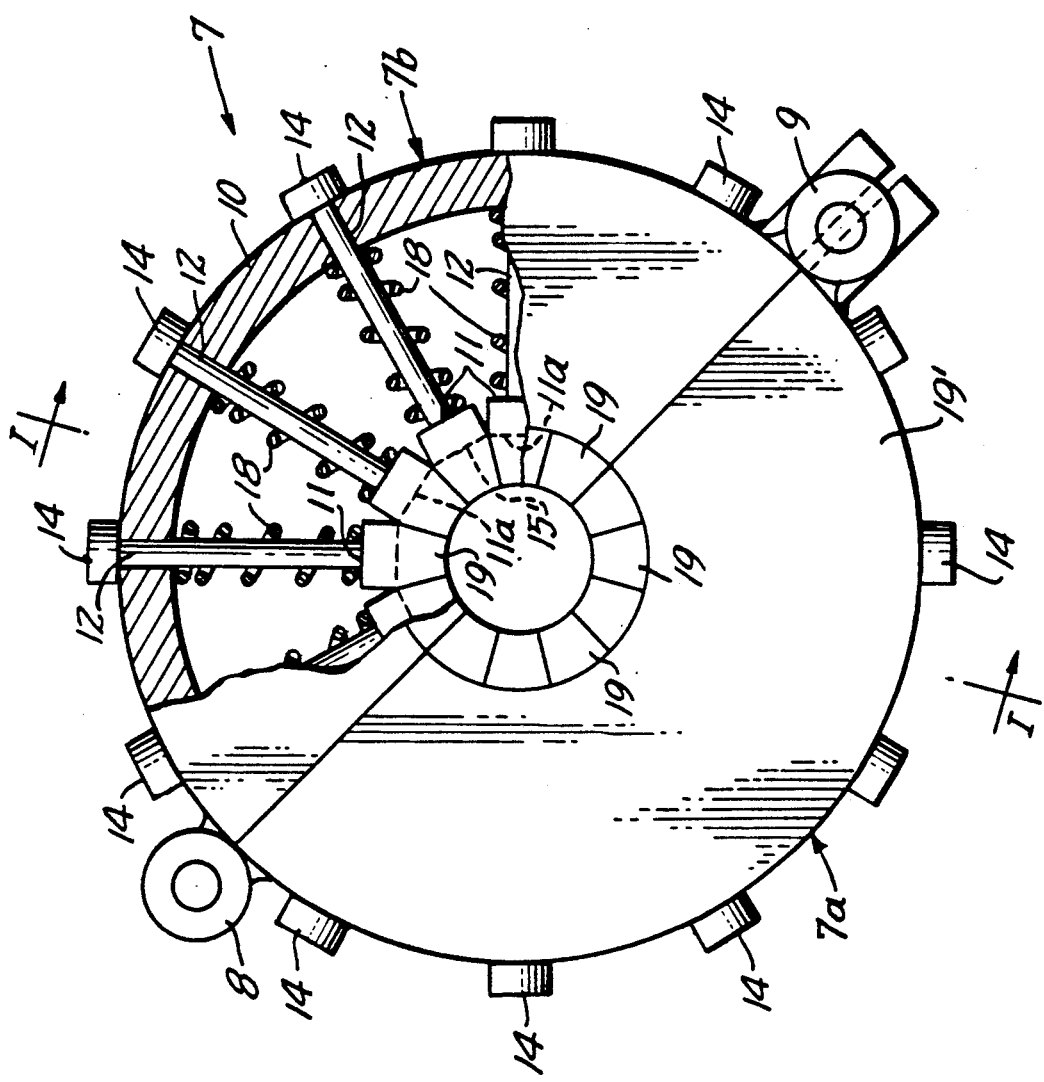

Other objects and advantages of the present invention will be apparent from the following detailed description of the presently preferred embodiments thereof, which description should be considered in conjunction with the accompanying drawings in which:

FIG. 1 shows schematically a partial longitudinal section, taken along line I-I indicated in FIG. 2, of an apparatus according to the invention in an operation stage wherein a cylindrical tubular support is being inserted into part of a sleeve; and FIG. 2 is a schematic end elevation view, partially in section, of the apparatus shown in FIG. 1.

With reference to the drawings, reference numeral 1 indicates the whole apparatus for inserting a rigid support into a sleeve for joints of electric cables, according to the present invention.

The apparatus 1 carries out a novel process comprising the following steps:

placing a sleeve between two half-shells substantially conforming to the shape of the sleeve itself and having means to engage this latter along its whole length;

applying on the sleeve radially inwardly directed forces uniformly distributed on the outer surface of the sleeve;

inserting into a first end of the sleeve a rigid support and translating the support towards a second end of the sleeve by means of an axial force applied on said support and directed towards the second end, said rigid support having an outer diameter greater than the inner diameter of the sleeve before stretching thereof;

increasing, during the insertion of the support, the magnitude of said radially inward forces in the zones where the end of the support gradually reaches;

applying on the outer surface of the sleeve, during the insertion of the support, opposing forces parallel to the axis of the sleeve, distributed along the entire length of the same and oriented in direction opposite to the axial force applied on the support;

discontinuing the opposite and radial forces after the support has been inserted in the sleeve for the entire length of this latter; and removing the sleeve and the support from the half-shells.

To this end, the apparatus 1 comprises an actuator 2, indicated in FIG. 1 only schematically since actuators are known per se, e.g. hydraulic or mechanical pulling devices, arranged to engage a rigid support 3 having in the illustrated example, a cylindrical tubular configuration. The support 3 may be made of a polymeric material. More particularly, the actuator 2 acts on a drawbar 4 connected to a truncated conical portion 5 integral with the front end 3a of the support 3. The actuator 2 transmits to the support 3 an advancing force directed in axial direction so that the support 3 itself is coaxially inserted in a sleeve 6 known per se and which can be either of the heat-shrinkable or of the elastomeric type.

Moreover, the apparatus 1 comprises a device, indicated as a whole with the reference numeral 7, arranged to engage the sleeve 6 for fixing its positioning, in the axial direction, during the insertion of the support 3.

The device 7 comprises two half-shells 7a, 7b, substantially conforming in shape to the shape of the sleeve 6 and connected, one to the other, by means of a hinge 8, or like means, (see FIG. 2) so that they can be mutually brought together from an open condition wherein the half-shells are separated to allow the insertion and the removal of the sleeve 6 from them to a closed condition wherein the pressure elements on the half-shells engage the sleeve 6 along its whole length. In the closed condition, the half-shells 7a, 7b are fastened, one to the other, such as by a closing bolt element 9.

Each one of the half-shells 7a, 7b has an outer supporting portion 10, shaped substantially as a cradle, to which a plurality of pressure elements 11 is connected, said elements being individually reciprocable with respect to the supporting portion. More particularly, each pressure element 11, having a substantially plate-like configuration, is connected to the supporting portion 10 of the corresponding half-shell 7a, 7b through a pair of stems 12 extending parallel to each other through respective slots 13 disposed in lengthwise spaced relation in the supporting portion 10. Each stem 12 projects outside the supporting portion 10 and has a stop element or enlarged head 14 which is arranged to abut on the supporting portion itself to prevent the releasing of the corresponding pressure element 11 from the said supporting portion 10.

As shown in FIG. 2, it is preferred that the pressure elements 11 be distributed according to a plurality of sectors arranged around a common axis coinciding with the axis of the sleeve 6. Each one of the said sectors comprises a plurality of pressure elements 11 serially aligned in the direction parallel to the axis of the sleeve 6. In this way, the pressure elements 11 are uniformly distributed to define, when the half-shells 7a, 7b are together, a containment seat 15 conforming substantially in shape to the sleeve 6 and suitable for receiving this latter as shown in FIG. 1.

Each pressure element 11 acts on the sleeve 6 through one of its contacting surfaces 11a which is, advantageously, provided with projections 16 uniformly distributed and alternating with recesses 17, or having an undulated or irregular profile, for the purposes which will be apparent from the following description.

The device 7 has thrusting means which operate between each one of the supporting shell portions 10 and the corresponding pressure elements 11 so as to urge each one of the pressure elements towards the axis of the sleeve 6 for applying radially inwardly directed forces on the outer surface of the sleeve 6 itself. In the illustrated example, such thrusting means are constituted by compression springs 18, each one being mounted on one of the stems 12. Alternatively, the springs 18 can be replaced with pneumatic or hydrodynamic drive systems or the like.

The apparatus of the present invention operates in the manner set forth hereinafter.

When the half-shells 7a, 7b are in open condition, the sleeve 6 is placed on the pressure elements 11 of the half-shells 7a which is disposed below the part 7b. The pressure elements 11 nearest the actuator 2 are provided with shoulders 19 in the form of inwardly extending fingers, and the sleeve 6 is disposed so as to have one end 6b abutting the shoulders 19.

Then the half-shells 7a, 7b are closed by bringing them together as shown in FIG. 2, and fastening the closing element 9. When the half-shells 7a, 7b are in the closed position, the sleeve 6, having an outer diameter greater than the diameter of the containment seat 15 defined by the pressure elements 11, causes the pressure elements to assume positions which compress the springs 18. In this situation, the pressure elements 11 subject the sleeve 6 to radially inwardly directed forces uniformly distributed along its outer surface. The presence of these forces assures a good contact of the outer surface of the sleeve 6 with the contacting surfaces 11a of the pressure elements 11, said contact being increased in consequence of the projections 16 and recesses 17 provided on the pressure elements.

When the half-shells 7a, and 7b have been closed and the above said radial forces have been obtained, the actuator 2 is set in action so that the rigid support 3, pulled by the drawbar 4 previously inserted through the sleeve 6, is inserted into the sleeve 6 starting from a first end 6a of this latter and pulled in direction of the second end 6b abutting the shoulders 19. The end of the supporting portion 10 nearer the actuator is partially closed by a plate 19' which, as the drawbar 4 is pulled can engage the housing of the actuator 2 or a stop provided intermediate the plate 19' and said housing.

Since the support 3 has an outer diameter greater than the inner diameter of the sleeve 6 before stretching, said sleeve 6 will be obliged to expand radially under the effect of radially outward forces transmitted to it by the support 3 during the insertion of the support 3. More specifically, these radially outward forces are applied gradually in the zone wherein the front end 3a of the support 3, as well as the truncated conical portion 5, reaches during the translation of the support 3 itself.

Advantageously, in accordance with the previously described process, the radially outwardly directed forces are opposed at the time at which they arise, by an increase of the radially inwardly directed forces of the springs 18 in the zones of the sleeve 6 at which the front end 3a of the support 3 gradually reaches. In fact, the radial expansion of the sleeve 6 causes a radial movement of the pressure elements 11 arranged in the zone wherein the expansion takes place. This movement causes a compression of the involved springs 18, with a consequent proportional increase of the force exerted by them on the pressure element 11 and therefore on the outer surface of the sleeve 6.

If hydraulic or pneumatic systems should be used in place of springs 18 to realize the thrusting means, the increase of the radial centripetal forces can be controlled through the actuation of microswitches, proximity sensors or the like means, resulting from the radial movement of the pressure elements 11.

Advantageously, the increase of the radially inward forces produces an increase of the friction between the outer surface of the sleeve 6 and the contacting surfaces 11a of the involved pressure elements 11. This assures that, between the outer surface of the sleeve 6 and the contacting surfaces 11a, said friction can originate opposing forces parallel to the axis of the sleeve 6 and directed in the direction opposite to the axial force that produces the advancing of the support 3. These opposite forces arise in the zone of the sleeve near the portion 5 and at the front end 3a of the support 3 during the insertion of the support 3 in the sleeve 6, and they are distributed in a substantially uniform manner along the portion of the sleeve 6 already encircling the support 3.

This latter phenomenon is very advantageous since it prevents, as has happened in the known technique, the arising of the negative effect of the thrust force exerted on the sleeve 6. In fact, the presence in the zone of the sleeve 6, not yet encircling the support 3, of the pressure elements 11 which apply forces in a ring around the not yet expanded portion of the sleeve 6 results in an increase in the values of the buckling loads required to cause bending of the sleeve at the portion thereof which has not yet received the support 3. Obviously, such action reduces the risk that the sleeve 6 may assume an undulated configuration or suffer undesired and dangerous bendings during the insertion of the support 3.

It is necessary to consider the fact that to assume an undulated configuration, the sleeve 6 should overcome the resistance offered by the springs 18 which are compressed in consequence of the movement of the corresponding pressure elements 11. Therefore, the deformations of the sleeve 6 are prevented by the action of the springs 18, independently of the advantage offered by the disclosed friction between the sleeve 6 and the pressure elements 11.

In addition to the previously disclosed advantages, the contact of the pressure elements 11 with the outer surface of the sleeve 6 also prevents the sleeve 6 from becoming shorter in consequence of the thrust exerted by the support 3, since the sleeve 6 is adequately held at any point along its length.

When the support 3 has been inserted in the sleeve 6 along the entire length thereof, causing the end 3a of the support to protrude from the end 6b of the sleeve 6, the shoulders 19 moving radially outwardly and sliding in the radial direction with respect to the plate 19', the opposite and radially inward forces are discontinued. This can be obtained easily by separating the half-shells 7a, 7b so that they are in the open condition. At this point, the sleeve 6, together with the support inserted therein, can be removed from the apparatus 1 by previously releasing the support 3 itself from the drawbar 4 and portion 5.

Thus, the present invention achieves the objects stated.

The apparatus and the process of the present invention can reduce, and even eliminate, the buckling loads on the sleeve 6 during the insertion of the support 3, as well as prevent adequately the tendency of the sleeve 6 to suffer undesired structural deformations.

A perfect fit between sleeve 6 and rigid support 3 is assured thereby eliminating the possibility that the sleeve has localized stresses which could impair the integrity and reliability of the joints of electric cables realized with the sleeve 6.

Another considerable advantage of the present invention consists of the fact that, due to the reduction of the bending risks caused by buckling loads and of the tendency of lengthwise shortening of the sleeve, it is possible to insert the rigid support at a speed substantially higher than that practicable with the known technique. Obviously, this gives rise to an appreciable increase of the productivity.

Another advantage of the invention is that, in the processing of the sleeves of heat-shrinkable type, the configuration of the contacting surfaces 11a of the pressure elements 11 produces corrugations on the outer surface of the sleeve. Said corrugations are useful when the sleeve is applied to electric cable joints since the operator has the possibility of observing, through the disappearance or the change of aspect of the corrugations themselves, whether or not the heating of the sleeve for causing its shrinkage has been carried out in regular manner.

Although preferred embodiments of the present invention have been described and illustrated, it will be apparent to those skilled in the art that various modifications may be made without departing from the principles of the invention.

The embodiments of the invention in which an exclusive property or privilege is claimed are defined as follows:

1. Apparatus for inserting a rigid support within a tubular, radially contractible and longitudinally distortable sleeve for an electric cable joint, said sleeve having an outer surface and a predetermined length and said support having an outer diameter greater than the internal diameter of said sleeve in its unstretched state, said apparatus comprising:

at least a pair of separable and adjacent shells which together form a chamber with a longitudinal axis for receiving the support and the sleeve therein, each shell having a arcuate outer supporting portion and an end wall, said end wall having an arcuate opening which together with the arcuate opening of the end wall of the adjacent shell provide an opening for the passage of support pulling means therethrough;

a plurality of pressure elements within said chamber and mounted on said supporting portion for radially reciprocating movement toward and away from the sleeve within said chamber, said pressure elements being uniformly distributed lengthwise and circumferentially of said chamber and having radially innermost surfaces with the radially innermost surfaces at one side of said axis in spaced relation to the radially innermost surfaces at the other side of said axis for receiving the sleeve therebetween and said innermost surfaces being adjacent to each other both circumferentially of said axis and in the direction longitudinally of said axis to provide together a substantially continuous cylindrical surface for engaging said sleeve, and said cylindrical surface having a length in the lengthwise direction of said chamber at least equal to said predetermined length of the sleeve for uniformly engaging the outer surface of the sleeve within said chamber along both the entire length of the sleeve and the circumference of the outer surface of the sleeve; and movable pressure applying means connected to each said pressure element, and said pressure applying means being radially movable outwardly of said axis with radially outwardly directed pressure applied thereto for urging said elements radially inwardly against the outer surface of the sleeve while permitting said elements to be moved radially outwardly as the support enters the sleeve while maintaining radially inward pressure on said elements and hence, on the sleeve.

2. Apparatus as set forth in claim 1 wherein each pressure element comprises a plate-like member with an arcuate innermost surface which conforms to the outer surface of the sleeve and at least one stem projecting radially outwardly therefrom and wherein said outer supporting portion has openings therethrough for slidably receiving said stem of each pressure element.

3. Apparatus as set forth in claim 2 wherein the radially innermost surface of each plate-like member has spaced projections extending radially inwardly therefrom for engaging the outer surface of the sleeve.

4. Apparatus as set forth in claim 2 wherein said pressure applying means comprises a plurality of compression springs, each spring being mounted on respective stems and acting between said supporting portion and said plate-like member.

5. Apparatus as set forth in claim 1 wherein said pressure applying means comprises a plurality of compression springs acting between said supporting portion and said pressure elements.

6. Apparatus as set forth in claim 1 wherein the pressure elements nearest said end wall have radially inwardly extending projections for engaging an end surface of the sleeve within said chamber.

7. Apparatus as set forth in claim 1 further comprising pulling means extending through said opening and between said innermost surfaces of said pressure elements for engaging the support and pulling said support in the axial direction through said chamber and within the sleeve engaged by said pressure elements.

* * * * *